United States Patent
Lockwood

(10) Patent No.: US 9,857,846 B2
(45) Date of Patent: Jan. 2, 2018

(54) PORTABLE COMPUTING DEVICE COVER INCLUDING A KEYBOARD

(71) Applicant: HEWLETT-PACKARD DEVELOPMENT COMPANY, L.P., Houston, TX (US)

(72) Inventor: Robert J Lockwood, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 15/112,503

(22) PCT Filed: Mar. 28, 2014

(86) PCT No.: PCT/US2014/032249
§ 371 (c)(1),
(2) Date: Jul. 19, 2016

(87) PCT Pub. No.: WO2015/147877
PCT Pub. Date: Oct. 1, 2015

(65) Prior Publication Data
US 2017/0010635 A1    Jan. 12, 2017

(51) Int. Cl.
*G06F 1/16* (2006.01)
*G06F 1/26* (2006.01)
(Continued)

(52) U.S. Cl.
CPC .......... *G06F 1/1669* (2013.01); *G06F 1/1616* (2013.01); *G06F 1/1628* (2013.01);
(Continued)

(58) Field of Classification Search
CPC .... G06F 1/1669; G06F 1/1616; G06F 1/1628; G06F 1/1632; G06F 1/1698; H04M 1/0216; H04M 1/0254
See application file for complete search history.

(56) References Cited

U.S. PATENT DOCUMENTS 8,129,939 B2 *  3/2012  Locker .................. G06F 1/1626
                                              307/64
2004/0037026 A1   2/2004  Mori
(Continued)

FOREIGN PATENT DOCUMENTS

CN      2552234      5/2003

OTHER PUBLICATIONS

A.P. Hu, "Wireless Bettery-less Computer Mouse with Super Capacitor Energy Buffer," May 23-25, 2007.

*Primary Examiner* — Stefan Stoynov
(74) *Attorney, Agent, or Firm* — HP Inc Patent Department

(57) ABSTRACT

Example implementations relate to powering a keyboard using power received via a secondary coil. For example, an apparatus includes a support member to support a part of a portable computing device in a tilted orientation. The support member includes a secondary coil to receive power from a primary coil in the portable computing device. The apparatus also includes a base member connected to the support member. The base member includes a first wireless module to receive a first portion of the power from the secondary coil and to communicate with a second wireless module in the portable computing device. The base member also includes a keyboard to receive a second portion of the power from the secondary coil and to generate signals to transmit to the portable computing device via the first wireless module.

15 Claims, 5 Drawing Sheets

(51) Int. Cl.
*H04M 1/02* (2006.01)
*A45C 11/00* (2006.01)

(52) U.S. Cl.
CPC .......... *G06F 1/1632* (2013.01); *G06F 1/1698* (2013.01); *G06F 1/266* (2013.01); *H04M 1/0216* (2013.01); *H04M 1/0254* (2013.01); *A45C 2011/003* (2013.01); *G06F 2200/1631* (2013.01); *G06F 2200/1633* (2013.01); *H04M 2201/32* (2013.01)

(56) References Cited

U.S. PATENT DOCUMENTS

| | | |
|---|---|---|
| 2008/0122660 A1 | 5/2008 | Koganei |
| 2009/0073650 A1 | 3/2009 | Huang et al. |
| 2009/0309550 A1* | 12/2009 | Liu .................. G06F 1/266 320/137 |
| 2010/0177476 A1 | 7/2010 | Hotelling et al. |
| 2012/0194448 A1 | 8/2012 | Rothkopf |
| 2013/0016467 A1 | 1/2013 | Ku |
| 2013/0031377 A1 | 1/2013 | Sultenfuss et al. |
| 2013/0084796 A1 | 4/2013 | Kerr |
| 2013/0175986 A1 | 7/2013 | Senatori |
| 2013/0293430 A1 | 11/2013 | Henty |
| 2014/0375123 A1* | 12/2014 | Lin .................. H02J 7/35 307/23 |

* cited by examiner

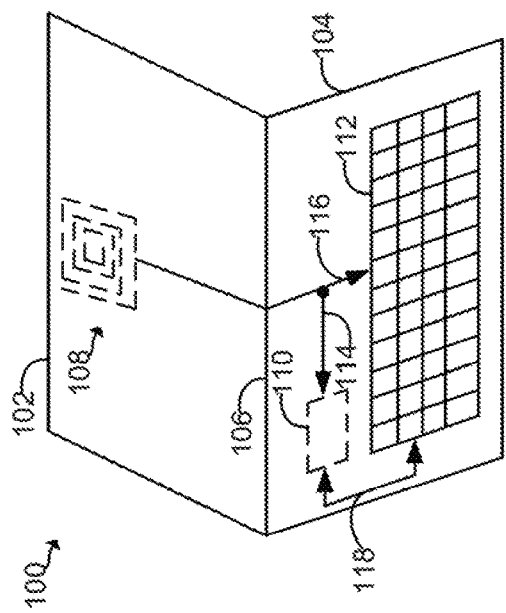
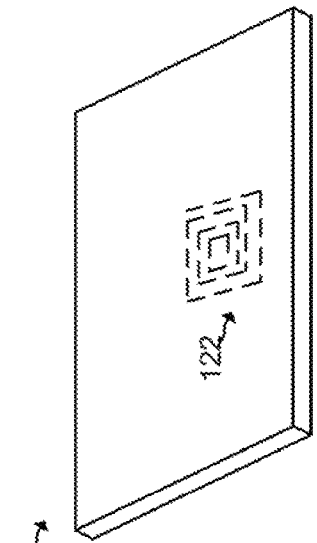
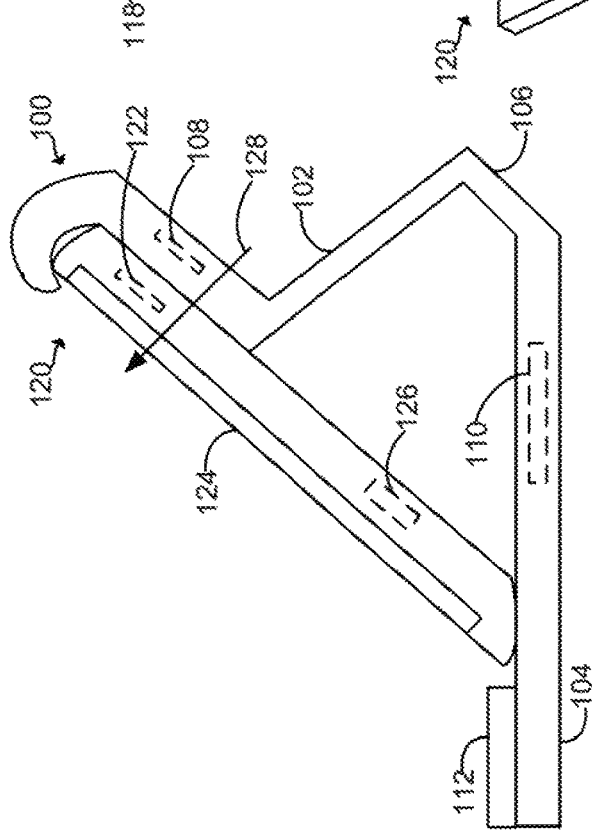

PORTABLE COMPUTING DEVICE COVER INCLUDING A KEYBOARD

BACKGROUND

A keyboard is a device that enables a computing device, such as a laptop computer or a server computer, to receive input from a user. A keyboard may be connected to a computing device via a variety of ways. For example, a wired keyboard may be connected to a computing device via a wired connection, such as via a Universal Serial Bus (USB) cable. A wireless keyboard may be connected to a computing device via a wireless connection, such as via a Bluetooth connection.

BRIEF DESCRIPTION OF THE DRAWINGS

Some examples of the present application are described with respect to the following figures:

FIG. 1A is a block diagram of an example portable computing device cover including a keyboard for receiving power from a portable computing device;

FIG. 1B is a top view of a back side of an example portable computing device for providing power to components in a portable computing device cover;

FIG. 1C is a side view of an example portable computing device cover in a titled orientation to receive power from an example portable computing device;

DETAILED DESCRIPTION

Figure 2A:
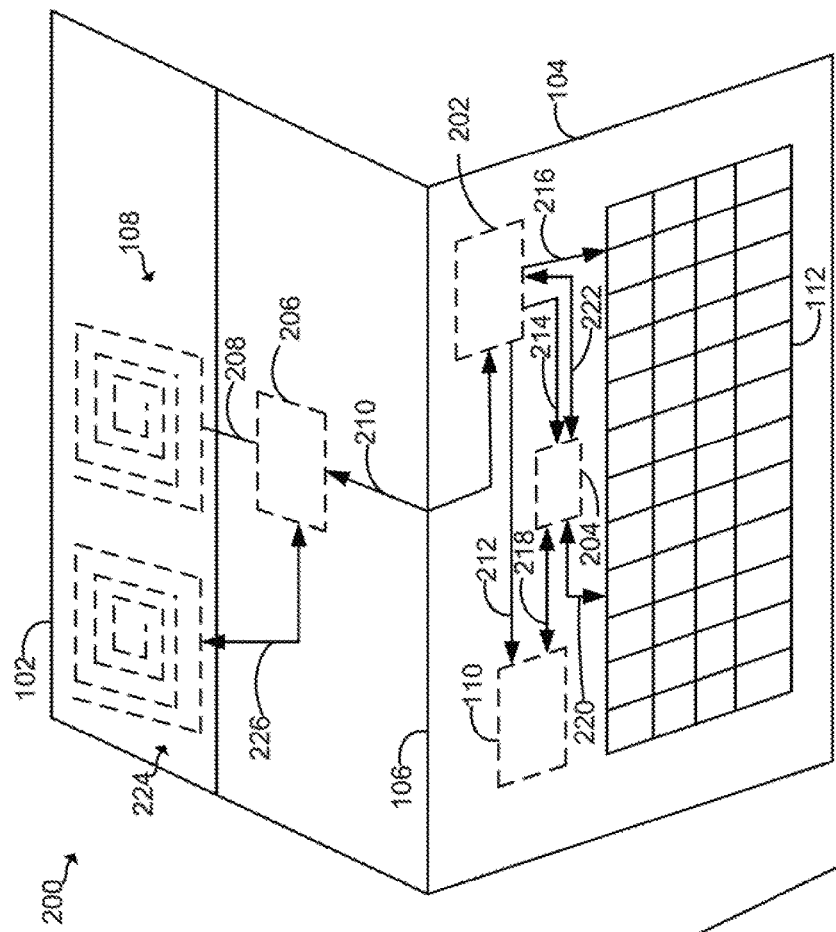
FIG. 2A is a block diagram of an example portable computing device cover including a keyboard and an internal power storage device.

As described above, a wireless keyboard may be connected to a computing device via a wireless connection. A wireless keyboard may be powered via an internal power source, such as a battery. When the internal power source is out of power, the internal power source may be replaced by a new internal power source. Thus, an operating cost of the wireless keyboard is increased. In some cases, the internal power source may be recharged via a cable connected between the internal power source and an external power source, such as a wall socket. Thus, ease of use of the wireless keyboard is reduced.

Examples described herein address the above challenges by providing a portable computing device cover including a wireless keyboard that can receive power from a portable computing device. For example, the portable computing device cover may include a secondary coil. The secondary coil may be located in a support member of the portable computing device cover. The secondary coil may receive power from a primary coil of a portable computing device. The portable computing device may be supported by the portable computing device cover. The power received from the primary coil may be used to power the wireless keyboard and/or other components of the portable computing device cover. In this manner, examples described herein may reduce an operating cost of the wireless keyboard and increase the ease of use of the wireless keyboard.

Referring now to the figures, FIG. 1A is a block diagram of an example portable computing device cover 100 including a keyboard for receiving power from a portable computing device. Portable computing device cover 100 may be an apparatus that protects a portable computing device from accidental damage, such as scratching or dropping, and facilitates an interaction between an external device and the portable computing device. For example, portable computing device cover 100 may facilitate a use of an external keyboard with a portable computing device by providing a resting surface such that a display of the portable computing device can be viewed by a user.

Portable computing device cover 100 may include a support member 102, a base member 104, and a hinge member 106. Support member 102 may be connected to base member 104 via hinge member 106. Support member 102 may be a structure that is rotatable to receive a part of a portable computing device. Base member 104 may be a structure that receives another part of the portable computing device. Hinge member 106 may be a structure that connects support member 102 and base member 104 together and provides rotation of support member 102 relative to base member 104.

Portable computing device cover 100 may also include a secondary coil 108, a wireless communication module 110, and a keyboard 112. Secondary coil 108 may be an electrical conductor, such as a metal wire, wound in a spiral. Wireless communication module 110 may be any electronic device or circuitry that exchanges data using air as a transmission medium. Keyboard 112 may be any electronic device that receives input from a user via a panel of keys or buttons. In some examples, secondary coil 108 may be located in support member 102. Wireless communication module 110 and keyboard 112 may be located in base member 104. Secondary coil 108 may transmit power to wireless communication module 110 and keyboard 112 via wired connections 114 and 116, such as metal traces, respectively. Keyboard 112 may be connected to wireless communication module 110 via a wired connection 118.

In some example, portable computing device cover 100 may include additional components, such as an internal power source, a communication coil, etc. In some examples, portable computing device cover 100 may be formed as a single unit by integrally forming support member 102, base member 104, and hinge member 106. For example, support member 102, base member 104, and hinge member 106 may be formed as a single unit via injection molding. In some examples, support member 102, base member 104, and hinge member 106 may be made from silicone, rubber, plastic, or any other flexible material.

FIG. 1B is a top view of a back side of an example portable computing device 120 for providing power to components in portable computing device cover 100. Portable computing device 120 may be a single electronic device that includes a touchscreen as a display. The touchscreen can be used for both viewing and input. A user of portable computing device 120 may provide input via the touchscreen by finger or stylus gestures. Portable computing device 120 may be a tablet computer or a touchscreen mobile phone (e.g., a smartphone).

Portable computing device 120 may include a plurality of components, such as a touchscreen, a processor, etc. For purpose of clarity, a primary coil 122 of portable computing device 120 is shown in FIG. 1B. Primary coil 122 may be an electrical conductor, such as a metal wire, wound in a spiral. Operation of primary coil 122 is described in more detail in FIG. 1C.

FIG. 1C is a side view of portable computing device cover 100 in a titled orientation to receive power from portable computing device 120. During operation, support member 102 may be rotated relative to base member 104 via hinge member 106 to receive portable computing device 120. For example, support member 102 may be rotated to a titled orientation such that an upper portion of portable computing device 120 may rest against a portion of support member 102 and a lower portion of portable computing device 120 may rest against base member 104. When portable computing device 120 is received in portable computing device cover 100, a touchscreen 124 of portable computing device 120 may be facing away from support member 102 and may be visible to a user. Also, primary coil 122 may be aligned with secondary coil 108 along an axis 128. Primary coil 122 may lie located on an opposite side of touchscreen 124.

Primary coil 122 may transmit power to secondary coil 108 via resonant inductive coupling power transfer. Primary coil 122 may draw the power from a power source and/or a power circuit (now shown) in portable computing device 120, such as a battery in portable computing device 120. The power received at secondary coil 108 may be provided to components of portable computing device cover 100, such as keyboard 112 and wireless communication module 110. For example, a first portion of the power may be provided to keyboard 112 and a second portion of the power may be provided to wireless communication module 110. When powered, keyboard 112 may receive inputs from a user of portable computing device cover 100 and generate signals corresponding to the inputs. Keyboard 112 may transmit the signals to wireless communication module 110. Wireless communication module 110 may transmit the signals to a wireless communication module 126 of portable computing device 120 so that portable computing device 120 be controlled via the inputs from the user. In some examples, wireless communication modules 110 and 126 may communicate via the Bluetooth protocol. Wireless communication modules 110 and 126 may also communicate via other wireless protocols, such as the Institute of Electrical and Electronics Engineers (IEEE) 802.11a protocol, the 802.11b protocol, etc.

Accordingly, receiving power from primary coil 122 via secondary coil 108 ensures that keyboard 112, wireless communication module 110, an other components of portable computing device cover 100 have power to operate when needed (i.e., when portable computing device 120 is received by portable computing device cover 100). Thus, portable computing device cover 100 may be made without an exposed power port as an external power cable is not needed. The lack of a port may allow portable computing device cover 100 to be more resistant to the elements, such as dust and water.

FIG. 2A is a block diagram of an example portable computing device cover 200 including a keyboard and an internal power storage device. Portable computing device cover 200 may be similar to portable computing device cover 100 of FIG. 1. In addition, portable computing device cover 200 may include an internal power source 202, a controller 204, a power controller 206, and a communication coil 224. Internal power source 202 may be any devices or circuitry that store power for use at a subsequent time. For example, internal power source 202 may be a rechargeable battery or a capacitor. Controller 204 may be a central processing unit (CPU), a semiconductor-based microprocessor, and/or other hardware devices suitable for retrieval and execution of instructions stored in computer-readable storage medium (not shown). Power controller 206 may be any devices or circuitry that regulates power (e.g., is filtering, rectifying, and/or conversion between alternate current and direct current).

Power controller 206 may be connected to secondary coil 108 via a wire connection 208, such as a wire trace or a power cable. Power controller 206 may be connected to internal power source 202 via a wired connection 210. Wired connection 210 may be used for both power transmission and data transmission. Power controller 206 may be connected to communication coil 224 via a wired connection 226. Internal power source 202 may be recharged by power received at secondary coil 108 via power controller 206. The power may be transmitted from a primary coil, such as primary coil 122 of FIG. 1. Internal power source 202 may provide power to wireless communication module 110, controller 204, keyboard 112, and power controller 206 via wire connections 212-216 and 210, respectively. Controller 204 may direct operations of wireless communication module 110, keyboard 112, and internal power source 202 via wire connections 218-222, respectively.

Figure 2B:
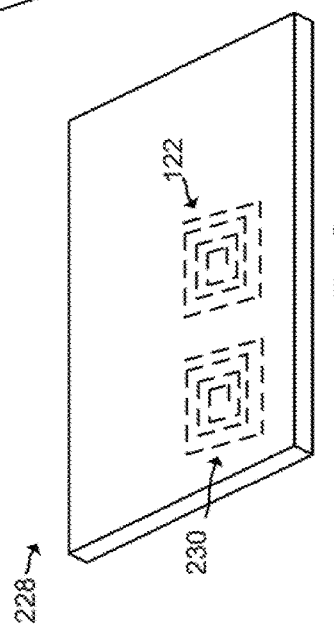
FIG. 2B is a block diagram of an example portable computing device including a primary coil and a communication coil.

FIG. 2B is a block diagram of an example portable computing device 228 including a primary coil and a communication coil. Portable computing device 228 may be similar to portable computing device 120 of FIG. 1B. Portable computing device 228 may also include a communication coil 230. Communication coil 230 may be used to transmit a signal corresponding to a presence of portable computing device 228 and to receive a signal indicating that a secondary coil is in range to receive power.

In some examples, communication coil 224 may be located in support member 102. It should be understood that communication coil 224 may be located in other parts of portable computing device cover 200. In some examples, communication coil 230 may be located in a back side of portable computing device 228. It should be understood that communication coil 230 may be located in other parts of portable computing device 228.

During operation, when portable computing device 228 is received in portable computing device cover 200. Power controller 206 may use communication coil 224 to detect the presence of primary oil 122. For example, portable computing device 228 may transmit a signal that indicates the presence of primary coil 122 via communication coil 230. When communication coil 224 receives or detects the signal, the signal may indicate that portable computing device 228 is in range to transmit power via primary coil 122. In response to detecting the signal, power controller 206 may transmit a second signal via communication coil 224 to portable computing device 228 to indicate that secondary coil 108 is in range to receive power. In response to receiving or detecting the second signal, portable computing device 228 may enable primary coil 122 and start transmitting power via primary coil 122. When portable computing device 228 does not detect or receive the second signal, portable computing device 228 may disable primary coil 122 or does not enable primary coil 122 when primary coil 122 is already disabled. In some examples, primary coil 122 may be disabled as a default state to conserve power. When communication coil 224 does not receive or detect the signal, power controller 206 may disable secondary coil 108 or does not enable secondary coil 108 when secondary coil 108 is already disabled.

Power controller 206 may regulate the power received via secondary coil 108. The regulated power may recharge internal power source 202. Internal power source 202 may provide a portion of the regulated power to keyboard 112, controller 204, and wireless communication module 110. Power controller 206 may enable secondary coil 108 to receive power from primary coil 122. For example, power controller 206 may disconnect secondary coil 108 from power controller 206 when secondary coil 108 is not receiving power. Power controller 206 may reconnect to secondary coil 108 to receive power. In some examples, when power controller 206 detects that internal power source 202 is fully charged, power controller 206 may disable secondary coil 108 by disconnecting secondary coil 108 from power controller 206. Power controller 206 may also transmit a third signal via communication coil 224 to portable computing device 228 to indicate that internal power source 202 is fully charged. In response to detecting the third signal, portable computing device 228 may disable primary coil 122 to stop transmitting power.

In some examples, portable computing device 228 may periodically (e.g., every 2 seconds) transmit an identification signal via communication coil 230 to indicate a presence of portable computing device 228; secondary coil 108 may be enabled to receive power as long as the identification signal is detected via communication coil 224. When portable computing device 228 is removed from portable computing device cover 200, the identification signal may become too weak to be detected by communication coil 224. In response to not detecting the identification signal, power controller 206 may disable secondary coil 108 as the lack of identification signal detection may indicate that primary coil 122 is not in range to transmit power.

Figure 3:
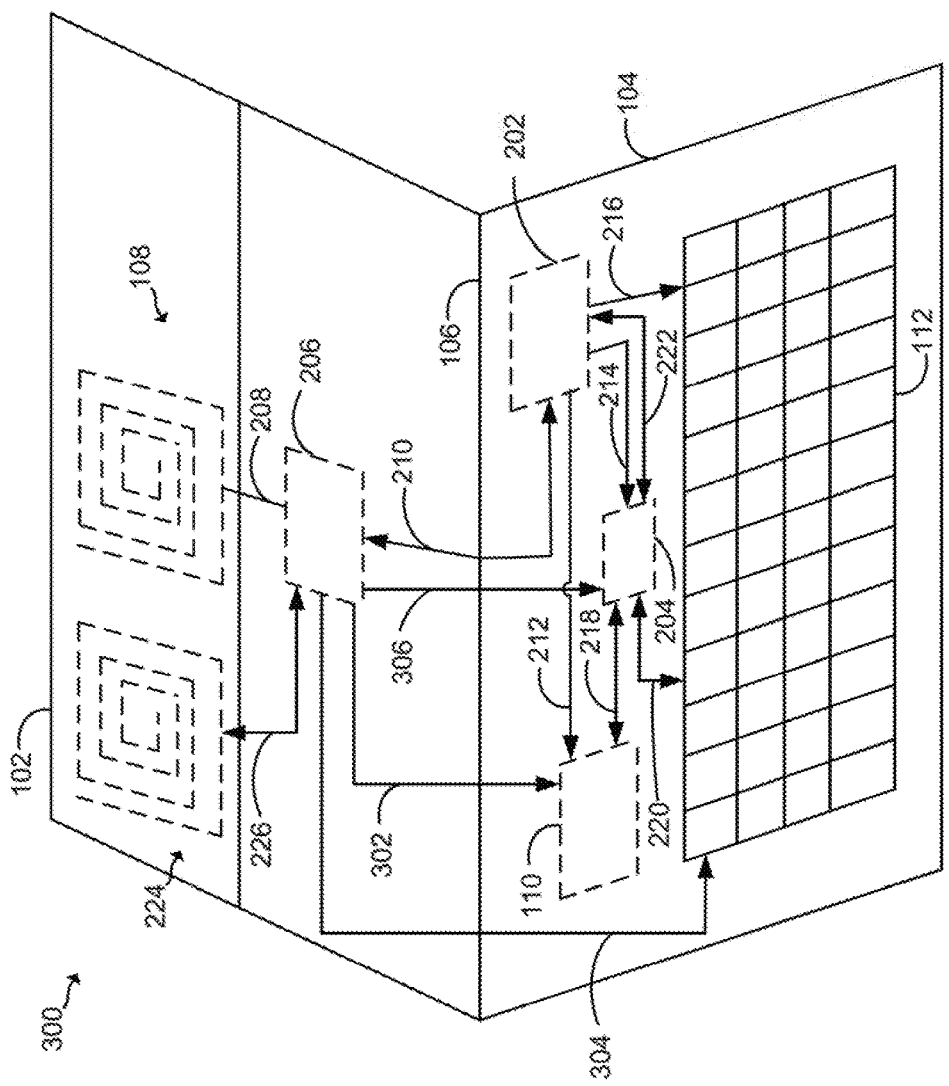
FIG. 3 is a block diagram of an example portable computing device cover including a keyboard and an internal power storage device.

FIG. 3 is a block diagram of an example portable computing device cover 300 including a keyboard and an internal power storage device. Portable computing device cover 300 may be similar to portable computing device cover 200 of FIG. 2A. In portable computing device cover 300, power controller 206 may be directly connected to components of portable computing device cover 300 to provide power to the components. For example, power controller 206 may provide power to wireless communication module 110, keyboard 112, and controller 204 via wired connections 302-306, respectively. Power controller 206 may also provide power to recharge internal power source 202 via wired connection 210.

During operation, when power is received via secondary coil 108 power controller 206 may transmit a first portion of the power to wireless communication module 110, keyboard 112, and controller 204. Power controller 206 may also transmit a second portion of the power to recharge internal power source 202. Thus, internal power source 202 may provide power to communication module 110, keyboard 112, and controller 204 when secondary coil 108 is not receiving power. When internal power source 202 is fully charged while secondary coil 108 is receiving power, power controller 206 may disconnect wired connection 210 (e.g., via a switch) to prevent over charging internal power source 202. In FIGS. 1A-1C, 2A-2B, and 3, particular components are illustrated in dash lines to indicate that the particular components are internal components. For example, wireless communication modules 110 and 126, primary coil 108, secondary coil 122, communication coils 224 and 230, power controller 206, internal power source 202, and controller 204 are illustrated in dash lines in FIGS. 1A-1C, 2A-2B, and 3.

Figure 4:
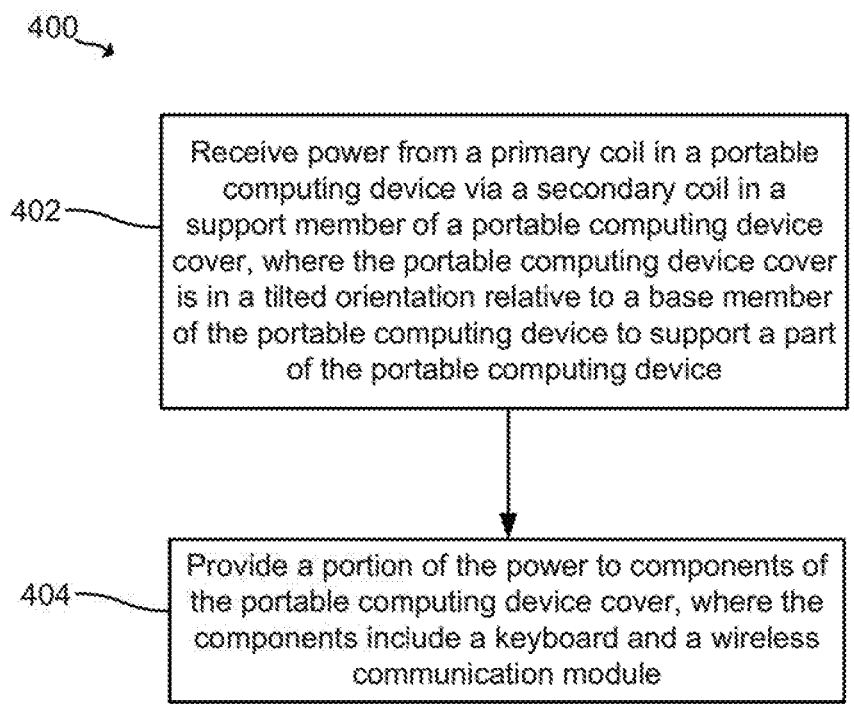
FIG. 4 is an example of a flowchart illustrating an example method of a portable computing device cover receiving power from a portable computing device.

FIG. 4 is an example of a flowchart illustrating an example method 400 of a portable computing device cover receiving power from a portable computing device. Method 400 may be implemented by portable computing device cover 100 of FIG. 1A, portable computing device cover 200 of FIG. 2A, or portable computing device cover 300 of FIG. 3. Method 400 may also include receiving power from a primary coil in a portable computing device via a secondary coil in a support member of a portable computing device cover, where the portable computing device cover is in a titled orientation relative to a base member of the portable computing device to support a part of the portable computing device, at 402. For example, referring to FIG. 1C, support member 102 may be rotated to a titled orientation such that an upper portion of portable computing device 120 may rest against a portion of support member 102 and a lower portion of portable computing device 120 may rest against base member 104. Primary coil 122 may transmit power to secondary coil 108 via resonant inductive coupling power transfer.

Method 400 may also include providing a portion of the power to components of the portable computing device cover, where the components include a keyboard and a wireless communication module, at 404. For example, referring to FIG. 1C, the power received at secondary coil 108 may be provided to components of portable computing device cover 100, such as keyboard 112 and wireless communication module 110.

Figure 5:
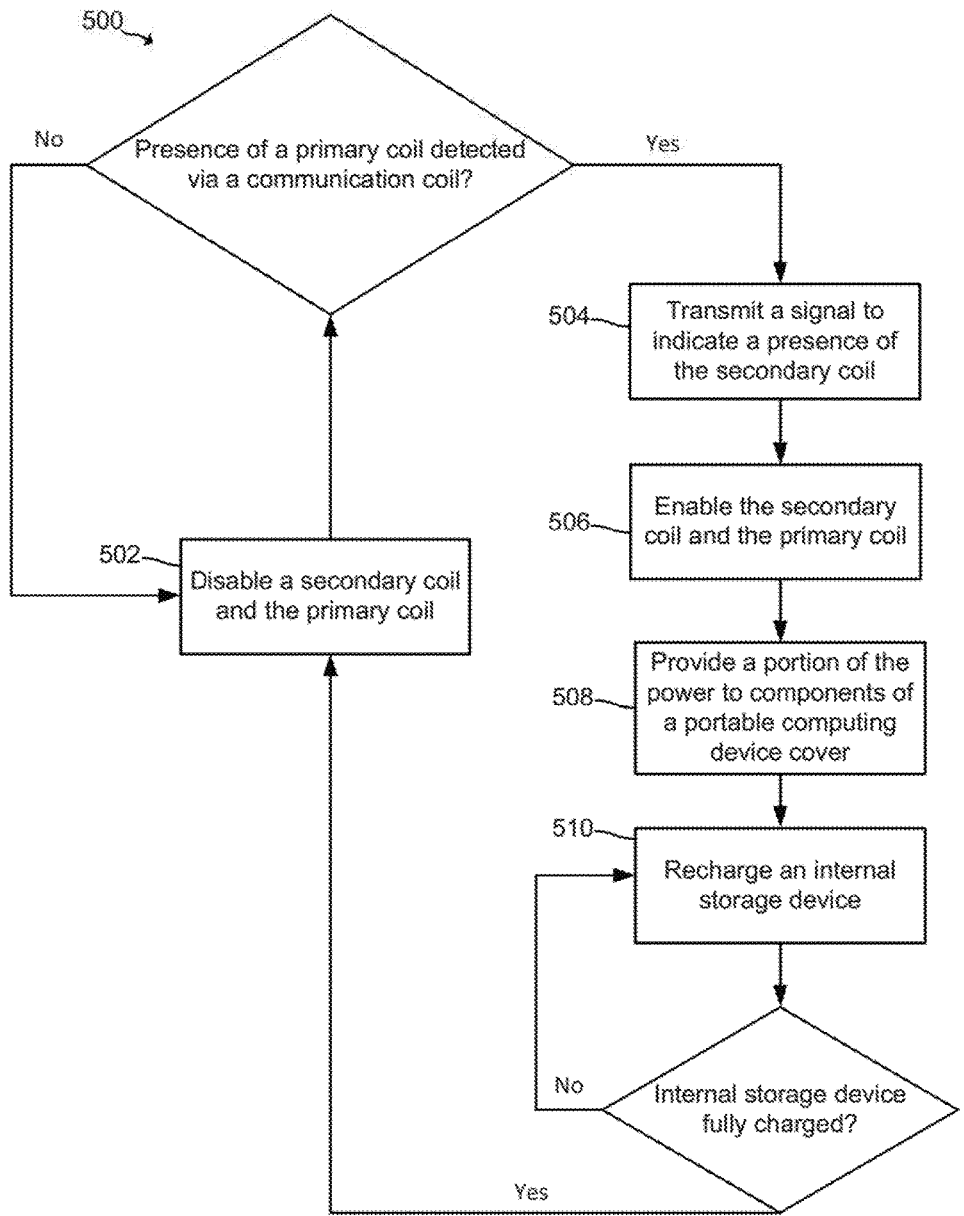
FIG. 5 is another example of a flowchart illustrating an example method of a portable computing device cover receiving power from a portable computing device.

FIG. 5 is another example of a flowchart illustrating an example method 500 of a portable computing device cover receiving power from a portable computing device. Method 500 may be implemented by portable computing device cover 100 of FIG. 1A, portable computing device cover 200 of FIG. 2A, or portable computing device cover 300 of FIG. 3. Method 500 may include disabling a secondary coil and the primary coil when a presence of a primary coil is not detected, at 502. For example, referring to FIG. 2A. When communication coil 224 does not receive or detect the signal, power controller 206 may disable secondary coil 108 or does not enable secondary coil 108 when secondary coil 108 is already disabled. When portable computing device 228 does not detect or receive the second signal, portable computing device 228 may disable primary coil 122 or does not enable primary coil 122 when primary coil 122 is already disabled. In some examples, primary coil 122 may be disabled as a default state to conserve power.

Method 500 may also include transmitting a signal to indicate a presence of the secondary coil when the presence of the primary coil is detected, at 504. For example, referring to FIG. 2A, in response to detecting the signal, power controller 206 may transmit a second signal via communication coil 224 to portable computing device 228 to indicate that secondary coil 108 is in range to receive power. Method 500 may further include enabling the secondary coil and the primary coil, at 506. For example, referring to FIG. 2A, power controller 206 may enable secondary coil 108 to receive power from primary coil 122. In response to receiving or detecting the second signal, portable computing device 228 may enable primary coil 122 and start transmitting power via primary coil 122.

Method 500 may further include providing a portion of the power to components of a portable computing device cover, at 508. For example, referring to FIG. 3, when power is received via secondary coil 108, power controller 206 may transmit a first portion of the power to wireless communication module 110, keyboard 112, and controller 204.

Method 500 may further include recharging an internal power source, at 510. For example, referring to FIG. 2A, power controller 206 may regulate the power received via secondary coil 108. The regulated power may recharge internal power source 202. When the internal power source is not fully charged, method 500 may further include recharging the internal power source, at 510. When the internal power source is fully charged, the secondary coil and the primary coil may be disabled, at 502.

The use of "comprising", "including" or "having" are synonymous and variations thereof herein are meant to be inclusive or open-ended and do not exclude additional unrecited elements or method steps.

What is claimed is:

1. An apparatus comprising:
   a support member to support a part of a portable computing device in a tilted orientation, wherein the support member includes a secondary coil to receive power from a primary coil in the portable computing device;
   a base member connected to the support member, wherein the base member includes:
      a first wireless module to receive a first portion of the power from the secondary coil and to communicate with a second wireless module in the portable computing device; and
      a keyboard to receive a second portion of the power from the secondary coil and to generate signals to transmit to the portable computing device via the first wireless module.

2. The apparatus of claim 1, further comprising a communication coil to detect a presence of the portable computing device, wherein the base member to support a second part of the portable computing device, and wherein the base member is connected to the support member via a rotatable hinge member.

3. The apparatus of claim 2, wherein the support member, the base member, and the rotatable hinge member are integrally formed.

4. The apparatus of claim 1, wherein the second receive the power from the primary coil via resonant inductive coupling power transfer.

5. The apparatus of claim 1, wherein the first wireless module to communicate with the second wireless module via a Bluetooth protocol.

6. The apparatus of claim 1, wherein the portable computing device includes a tablet computing device or a smartphone.

7. A method comprising:
   receiving power from a primary coil in a portable computing device via a secondary coil in a support member of a portable computing device cover, wherein the portable computing device cover is in a tilted orientation relative to a base member of the portable computing device to support a part of the portable computing device; and
   providing a portion of the power to components of the portable computing device covers, wherein the components include a keyboard and a wireless communication module.

8. The method of claim 7, further comprising:
   generating signals from the keyboard;
   communicating the signals to a second wireless communication module of the portable computing device via the wireless communication module; and
   providing a second portion of the power to a power storage device of the portable computing device.

9. The method of claim 7, further comprising:
   detecting a presence of the portable computing device via a communication coil; and
   in response to detecting the presence of the portable computing device, transmitting a signal to enable the primary coil.

10. The method of claim 7, wherein the secondary coil is aligned with the primary coil when the portable computing device is supported by the support member in the tilted orientation.

11. The method of claim 7, wherein the support member is rotated via a hinge member of the portable computing device cover.

12. The method of claim 7, wherein the components are located in the base member.

13. An apparatus comprising:
   a portable computing device including:
      a housing;
      a display located on a side of the housing;
      a primary coil located on an opposite side of the display to transmit power to a secondary coil in a support member a portable computing device cover; and
      a second wireless communication module to receive signals from a first wireless communication module of the portable computing device cover, wherein the signals are generated via a keyboard of the portable computing device cover powered by a first portion of the power, and wherein the first wireless communication module is powered by a second portion of the power.

14. The apparatus of claim 13, wherein the primary coil is aligned with the secondary coil when the portable computing device is supported by the support member.

15. The apparatus of claim 13, further comprising a communication coil to transmit a signal indicating a presence of the portable computing device.

* * * * *

UNITED STATES PATENT AND TRADEMARK OFFICE
CERTIFICATE OF CORRECTION

PATENT NO. : 9,857,846 B2
APPLICATION NO. : 15/112503
DATED : January 2, 2018
INVENTOR(S) : Robert J. Lockwood Page 1 of 1

It is certified that error appears in the above-identified patent and that said Letters Patent is hereby corrected as shown below:

In the Claims

Column 7, Claim 4, Line 39, after "second" insert -- coil to --.

Column 8, Claim 7, Line 5, delete "covers," and insert -- cover, --, therefor.

Column 8, Claim 13, Line 37, after "member" insert -- of --.

Signed and Sealed this
Twenty-ninth Day of May, 2018

Andrei Iancu
*Director of the United States Patent and Trademark Office*